United States Patent
Kui

(10) Patent No.: US 10,751,948 B2
(45) Date of Patent: Aug. 25, 2020

(54) SEAM CONSTRUCTION USING RADIO FREQUENCY WELDING AND TAPE

(71) Applicant: BETTER GALAXY, LLC, Las Vegas, NV (US)

(72) Inventor: Lu Kui, Yangzhou (CN)

(73) Assignee: BETTER GALAXY, LLC, Las Vegas, NV (US)

(*) Notice: Subject to any disclaimer, the term of this patent is extended or adjusted under 35 U.S.C. 154(b) by 247 days.

(21) Appl. No.: 15/460,886

(22) Filed: Mar. 16, 2017

(65) Prior Publication Data

US 2017/0266871 A1    Sep. 21, 2017

Related U.S. Application Data

(60) Provisional application No. 62/310,326, filed on Mar. 18, 2016.

(51) Int. Cl.
| | |
|---|---|
| *B29C 65/08* | (2006.01) |
| *B29C 65/50* | (2006.01) |
| *B29C 65/00* | (2006.01) |
| *B29C 65/72* | (2006.01) |
| *B29C 65/82* | (2006.01) |
| *B29C 65/04* | (2006.01) |
| *A41D 27/24* | (2006.01) |
| *B29C 65/48* | (2006.01) |
| *B29C 65/62* | (2006.01) |
| *B29L 31/48* | (2006.01) |
| *B29L 31/00* | (2006.01) |

(52) U.S. Cl.
CPC ............ *B29C 65/08* (2013.01); *B29C 65/04* (2013.01); *B29C 65/5021* (2013.01); *B29C 65/5028* (2013.01); *B29C 65/5042* (2013.01); *B29C 65/72* (2013.01); *B29C 65/8207* (2013.01); *B29C 65/8215* (2013.01); *B29C 65/8246* (2013.01); *B29C 66/02241* (2013.01); *B29C 66/0384* (2013.01); *B29C 66/43* (2013.01); *B29C 66/729* (2013.01); *A41D 27/245* (2013.01); *B29C 65/4815* (2013.01); *B29C 65/62* (2013.01); *B29C 65/8253* (2013.01); *B29C 2793/0081* (2013.01); *B29K 2995/0067* (2013.01); *B29K 2995/0069* (2013.01); *B29L 2031/485* (2013.01); *B29L 2031/7128* (2013.01)

(58) Field of Classification Search
CPC ..... B29C 65/08; B29C 65/5028; B29C 65/72; B29C 66/43
See application file for complete search history.

(56) References Cited

U.S. PATENT DOCUMENTS

| | | | |
|---|---|---|---|
| 4,824,498 A * | 4/1989 | Goodwin | ........... A47G 27/0468 156/71 |
| 6,716,778 B1 | 4/2004 | Hottner | |

(Continued)

OTHER PUBLICATIONS

WO, PCT/2017/022757 ISR and Written Opinion, dated Jun. 6, 2017.

*Primary Examiner* — Mark A Osele
*Assistant Examiner* — Christopher C Caillouet
(74) *Attorney, Agent, or Firm* — One LLP; Joseph K. Liu

(57) ABSTRACT

A process of constructing an air tight and water tight seam, comprising cutting a sheet of selected material into two or more panels, sealing the panels at respective selected edges using an ultrasonic machine to form a seam, overlaying the seam with a tape made of the same selected material, and sealing the tape and seam using a radio frequency (RF) welding machine.

6 Claims, 21 Drawing Sheets

(56) References Cited

U.S. PATENT DOCUMENTS

| | | |
|---|---|---|
| 8,359,991 B2 | 1/2013 | Henry et al. |
| 8,741,412 B2 | 6/2014 | Wangbunyen et al. |
| 9,139,352 B2 | 9/2015 | Seiders et al. |
| 2008/0044614 A1 | 2/2008 | Hannon |

* cited by examiner

Fabric Strength Tests

Test Method: Fabric Tensile
Temperature: 0°C
Elongation Speed: 100 mm/min
Width: 50mm Standard: G8/T 3923.1
Humidity: 0%
Gauge Length: 200 mm
Test Width: 50mm Date of Test: 2016 Jan 12
Pretention: 2N
Range: 2500N
Clip Distance: 200mm Operated by:
Force: 5N
Lot No.:
Product name:

| Item Unit => | Breaking Force N | Breaking Strength N/mm | Elongation at Break mm | Elongation at Rupture (%) | Breaking Time s | Bursting Strength N.mm | Break-off force N | Tensile Strength mm | Tensile Rate (%) | Break-off Strength (N.mm) | Nominal Tensile Strength N/mm | Initial Modulus N/mm |
|---|---|---|---|---|---|---|---|---|---|---|---|---|
| 1 | 221.41 | 4.43 | 59.98 | 29.99 | 35.96 | 6650.55 | 7.5 | 60.11 | 30.06 | 6661.89 | 221.41 | 197.65 |
| 2 | 218.22 | 4.36 | 53.85 | 26.92 | 32.29 | 5636.42 | 7.54 | 53.97 | 26.98 | 5645.4 | 218.22 | 204.14 |
| 3 | 227.34 | 4.55 | 49.98 | 24.99 | 29.97 | 5444.69 | 6.08 | 50.1 | 25.05 | 5452.39 | 227.34 | 263.81 |
| 4 | 229.21 | 4.58 | 56.69 | 28.35 | 34 | 6123.64 | 5.49 | 56.65 | 28.43 | 6143.56 | 229.21 | 140.56 |
| 5 | 248.78 | 4.98 | 64.31 | 32.16 | 38.56 | 7875.35 | 7.04 | 64.42 | 32.21 | 7883 | 248.78 | 189.43 |
| 6 | 203.98 | 4.08 | 50.92 | 25.46 | 30.53 | 4801.21 | 5.67 | 51.04 | 25.52 | 4807.61 | 203.98 | 166.87 |
| 7 | 528.94 | 10.58 | 52.46 | 26.23 | 31.45 | 13234.01 | 5.9 | 52.61 | 26.3 | 13250.74 | 528.94 | 385.99 |
| 8 | 245.09 | 4.9 | 30.41 | 15.2 | 18.23 | 3147.93 | 10.69 | 37.79 | 18.9 | 4683.96 | 245.09 | 192.66 |
| 9 | 558.64 | 11.17 | 54.91 | 27.46 | 32.93 | 15029.56 | 6.86 | 55.09 | 27.55 | 15063.97 | 558.64 | 400.82 |
| 10 | 275.38 | 5.51 | 31.56 | 15.78 | 18.92 | 3772.44 | 223.56 | 35.04 | 17.52 | 4540.08 | 275.38 | 273.55 |
| 11 | 587.12 | 11.34 | 59.16 | 29.58 | 35.47 | 16644.73 | 6.95 | 59.31 | 29.65 | 16666.63 | 567.12 | 352.62 |
| 12 | 373.42 | 7.47 | 44.92 | 22.46 | 26.94 | 6283.03 | 5.31 | 47.05 | 23.52 | 6918.47 | 373.42 | 226.57 |

FIG. 22

SEAM CONSTRUCTION USING RADIO FREQUENCY WELDING AND TAPE

CROSS-REFERENCE TO RELATED APPLICATION

The present application claims benefit of priority with U.S. Provisional Application No. 62/310,326, filed Mar. 18, 2016, which is hereby incorporated by reference.

TECHNICAL FIELD

Embodiments of the present invention generally relate to seam construction, and more specifically to a seam construction using radio frequency welding with a tape finished construction.

BACKGROUND OF THE INVENTION

Radio frequency (RF) welding is a method for joining thin sheets of certain plastics with chemical dipoles together. Some of these plastic materials include thermoplastics such as polyvinylchloride (PVC), polyurethane (PU), thermoplastic polyurethane (TPU), thermoplastic elastomers (TPE), etc. The materials can be heated with high frequency electromagnetic waves. The method uses high frequency, usually between 13 and 120 MHz, electromagnetic energy to fuse the materials. As such, RF welding may also be known as high frequency (HF) welding or dielectric welding. Generally, a rapidly alternating electric field is set up between two metal welding plates or bars, where two pieces of the material are placed. The electric field causes the polar molecules found in the material to oscillate and orient themselves with respect to the field. The energy generated by this process causes a temperature increase (heat) which results in melting of the material. The welding plates or bars are then pressed together, forming a weld between the two pieces.

Because RF welding is better than conventional stitching used in constructing seams, RF welding has often been used to construct seams for various types of products, including clothing garments, bags, tents, etc., just to name a few examples. It is advantageous, therefore, to construct seams that are strong, air tight, and water tight.

However, the quality of welds or bonds formed by the RF welding process is usually a result of a complicated combination of machine parameters (power output, frequency), the temperature profile and bar pressure, and the material type and thickness. Achieving a strong and consistently leak-proof seal using RF welding can be difficult.

Therefore, it would be highly beneficial to provide systems and methods for seam construction that provide seams that are consistently strong, air tight, and water tight.

SUMMARY OF THE INVENTION

Provided herein are embodiments of methods for seam construction that provide seams that are consistently strong, air tight, and water tight, and more specifically methods for seam construction using the combination of RF welding and tape finish. The methods of constructing a consistently strong, air tight and water tight seam may include cutting a sheet of material made of a selected material into two panels, sealing the two panels at a respective selected edge of each of the two panels using an ultrasonic machine, thus forming a seam, overlaying the seam with a section of tape made of the selected material, and sealing the section of tape and the seam using a radio frequency (RF) welding machine.

This summary and the following detailed description are merely exemplary, illustrative, and explanatory, and are not intended to limit, but to provide further explanation of the invention as claimed. Additional features and advantages of the invention will be set forth in the descriptions that follow, and in part will be apparent from the description, or may be learned by practice of the invention. The objectives and other advantages of the invention will be realized and attained by the structure particularly pointed out in the written description, claims and the appended drawings and support materials.

BRIEF DESCRIPTION OF THE DRAWINGS

Understanding this invention will be facilitated by the following detailed description of the preferred embodiments considered in conjunction with the accompanying drawings, in which like numerals refer to like parts. Note, however, that the drawings are not drawn to scale.

FIG. 22 illustrates a chart showing the results of the exemplary tests of FIGS. 10-21 according to an embodiment of this invention.

DETAILED DESCRIPTION

Figure 1:
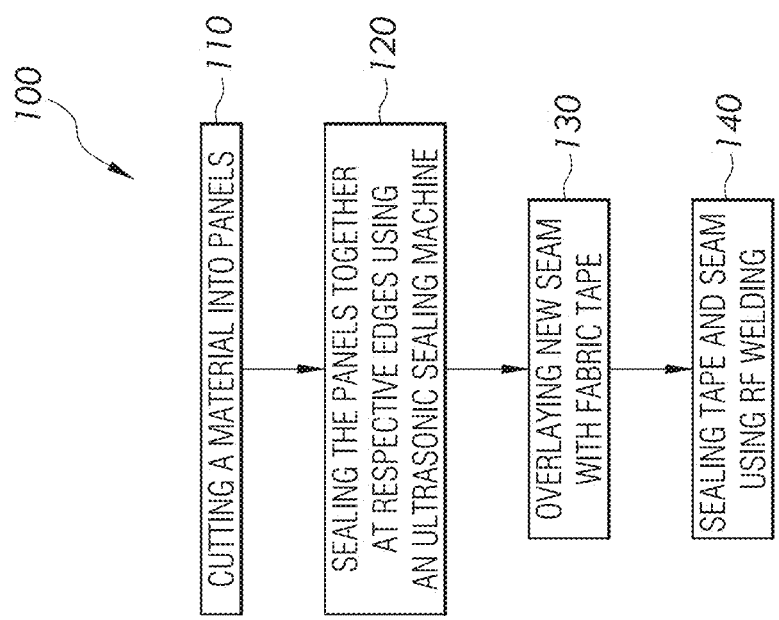
FIG. 1 illustrates an exemplary flowchart of a seam construction process according to an embodiment of this invention.

The drawings, support materials, and related descriptions of the embodiments have been simplified to illustrate elements that are relevant for a clear understanding of these embodiments, while eliminating various other elements found in conventional seam construction and RF welding methods. Those of ordinary skill in the art may thus recognize that other elements and/or steps are desirable and/or required in implementing the embodiments that are claimed and described. But, because those other elements and steps are well known in the art, and because they do not necessarily facilitate a better understanding of the embodiments, they are not discussed. This disclosure is directed to all applicable variations, modifications, changes, and implementations known to those skilled in the art. As such, the following detailed descriptions are merely illustrative and exemplary in nature and are not intended to limit the embodiments of the subject matter or the uses of such embodiments. As used in this application, the terms "exemplary" and "illustrative" mean "serving as an example, instance, or illustration." Any implementation described as exemplary or illustrative is not meant to be construed as preferred or advantageous over other implementations. Further, there is no intention to be bound by any expressed or implied theory presented in the preceding background of the invention, brief summary, or the following detailed description.

In the following description and in the figures, like elements are identified with like reference numerals. The use of "e.g.," "etc," and "or" indicates non-exclusive alternatives without limitation, unless otherwise noted. The use of "including" or "includes" means "including, but not limited to," or "includes, but not limited to," unless otherwise noted.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Referring now to the figures, wherein like reference numerals designate identical or corresponding parts throughout the several views and embodiments, methods and processes in accordance with the present invention are illustrated in FIGS. 1 to 26.

Referring to FIG. 1, an exemplary flowchart of a process 100 according to some embodiments of the invention is illustrated. In some exemplary operations, the steps for constructing a consistently strong, air tight, and water tight seam may generally include cutting a sheet of material made of a selected material into panels (Step 110), sealing the panels together at respective edges using an ultrasonic sealing machine (Step 120), forming a seam. The new seam is then overlaid with a section of a fabric tape, which has been coated with polyurethane (PU), thermoplastic polyurethane (TPU), Polyvinyl Chloride (PVC), Ethylene-Vinyl Acetate (EVA), Polytetrafluoroethylene (PTFE), or a combination thereof, or with other suitable material (Step 130). An area adjacent to both sides and along the length of the seam may also be coated with polyurethane (PU), thermoplastic polyurethane (TPU), Polyvinyl Chloride (PVC), Ethylene-Vinyl Acetate (EVA), Polytetrafluoroethylene (PTFE), or a combination thereof, or with other suitable material. The tape and the seam are then sealed using an RF welding machine (Step 140).

In Step 110, a sheet of a selected material may be cut into panels of desired shapes and sizes, based on the specifications of the desired products. The products may include, for example, jackets, pants, back packs, duffle bags, dry bags, tents, sleeping bags, and so on, as shown, for example, in FIGS. 23-26. Any conventional fabric cutting machine known in the art may be used for the cutting.

Figure 2:
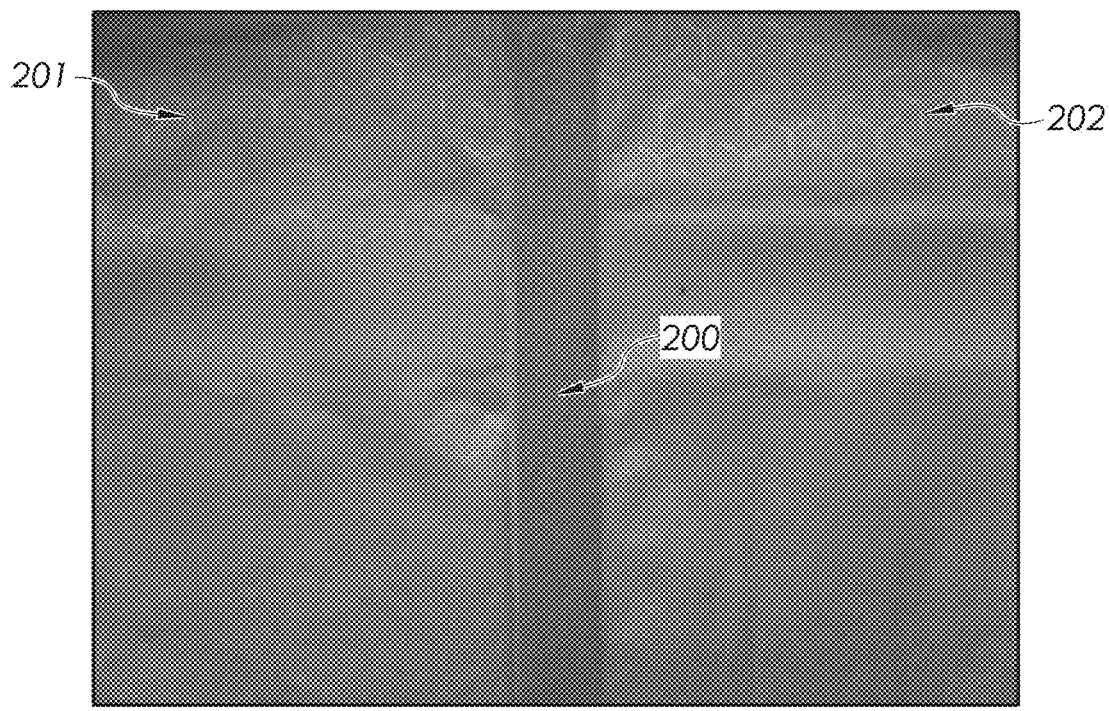
FIG. 2 illustrates an exemplary top rear view of a seam for panels of a 70D material according to an embodiment of this invention.
Figure 3:
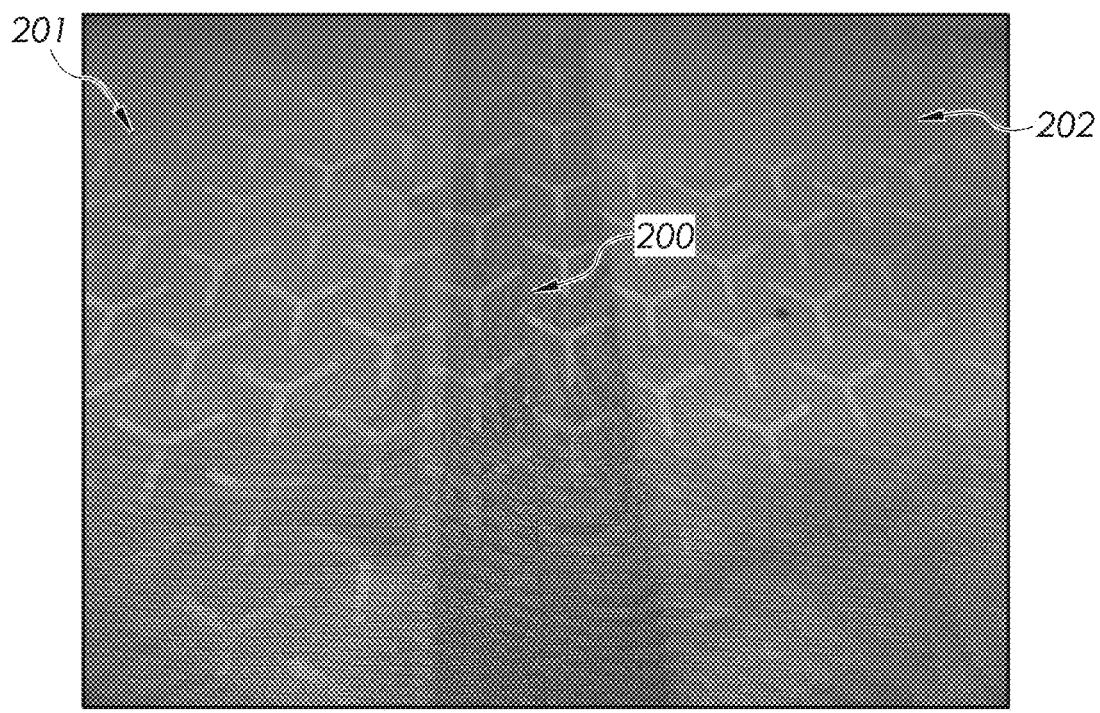
FIG. 3 illustrates an exemplary perspective rear view of a seam for panels of a 70D material according to an embodiment of this invention.
Figure 6:
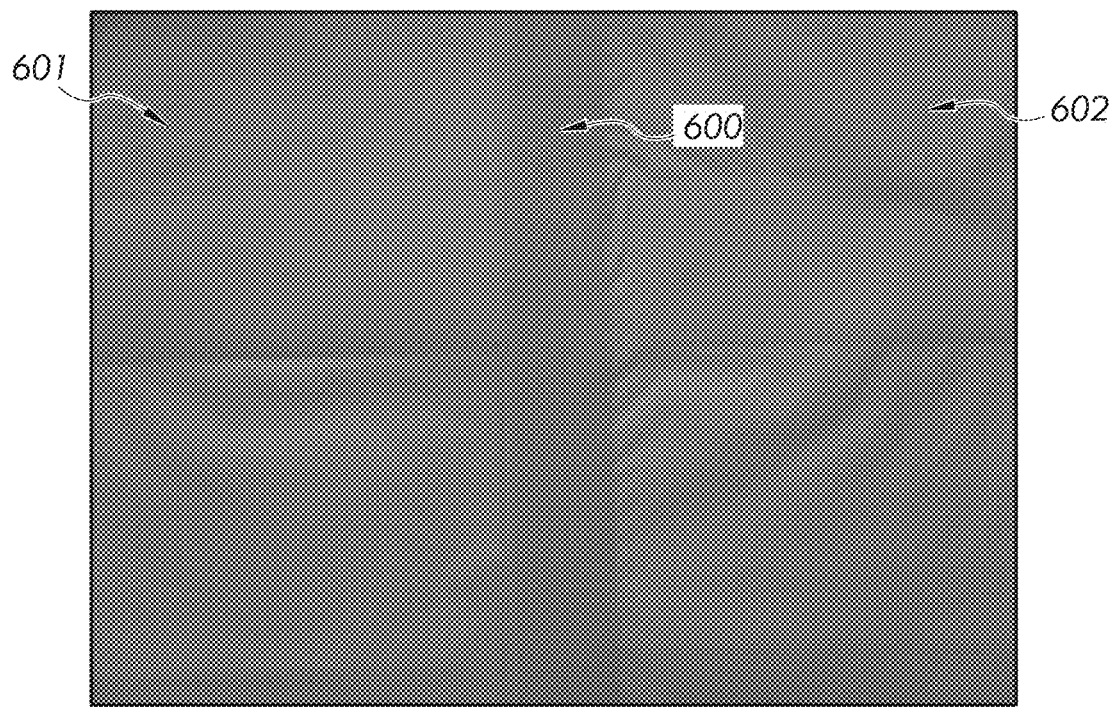
FIG. 6 illustrates an exemplary top rear view of a seam for panels of a 20D material according to an embodiment of this invention.
Figure 7:
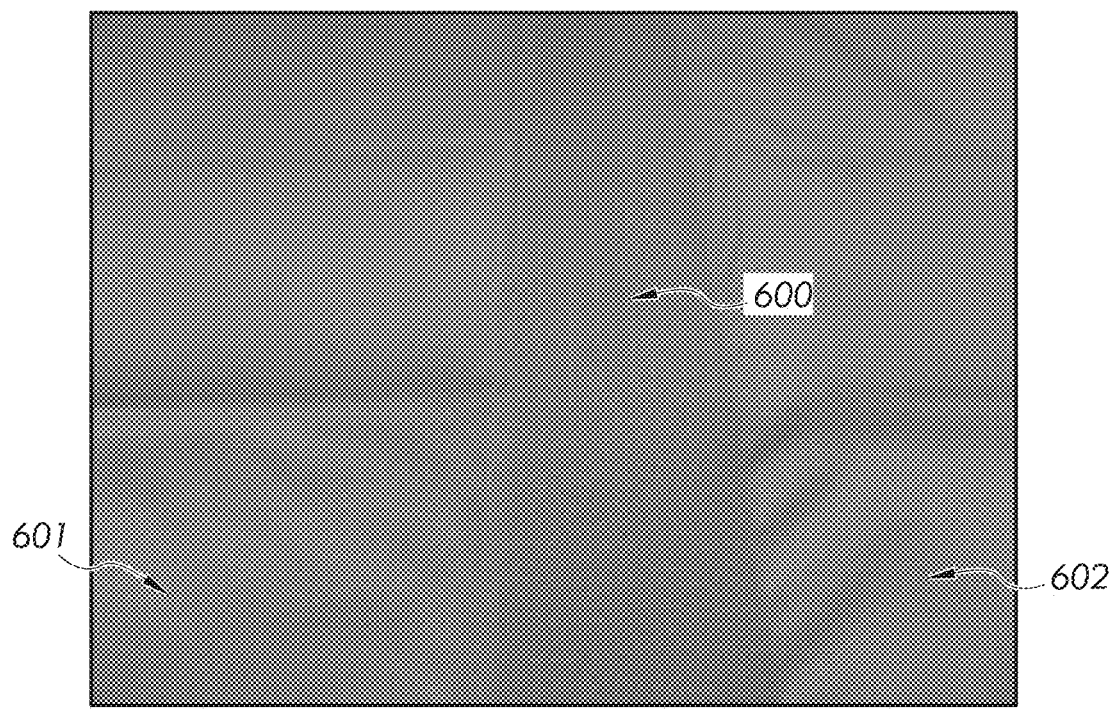
FIG. 7 illustrates an exemplary perspective rear view of a seam for panels of a 20D material according to an embodiment of this invention.

Once the sheet of the selected material has been cut into panels, and the edges that need to be sealed have been determined, in Step 120, in some embodiments, the edges may be sealed together using an ultrasonic sealing machine. As a result, a new seam is formed at the respective edges of the panels. FIGS. 2 and 3 illustrate respectively an exemplary top rear view and an exemplary perspective rear view of two sealed 70D fabric panels 201 and 202, forming a seam 200. FIGS. 6 and 7 illustrate respectively an exemplary top front view and an exemplary perspective front view of the sealed 20D fabric panels 601 and 602, forming a seam 600. Although examples of 20D and 70D materials are illustrated, any 100D and lighter, for example, as low as 5D material may be used.

Any conventional ultrasonic sealing machine known in the art may be used. With ultrasonic sealing, the heat required for melting is generated inside the material, for example, not by heat input from the outside as is the case with heat sealing.

In Step 130, in some embodiments, a tape made of the same material as the material of the fabric panels may be used. The tape may be coated with polyurethane (PU), thermoplastic polyurethane (TPU), Polyvinyl Chloride (PVC), Ethylene-Vinyl Acetate (EVA), Polytetrafluoroethylene (PTFE), or a combination thereof. Other suitable coating materials may also be used. The tape may be coated on the side that will be coupled, or bonded, to the seam, as described below.

Figure 4:
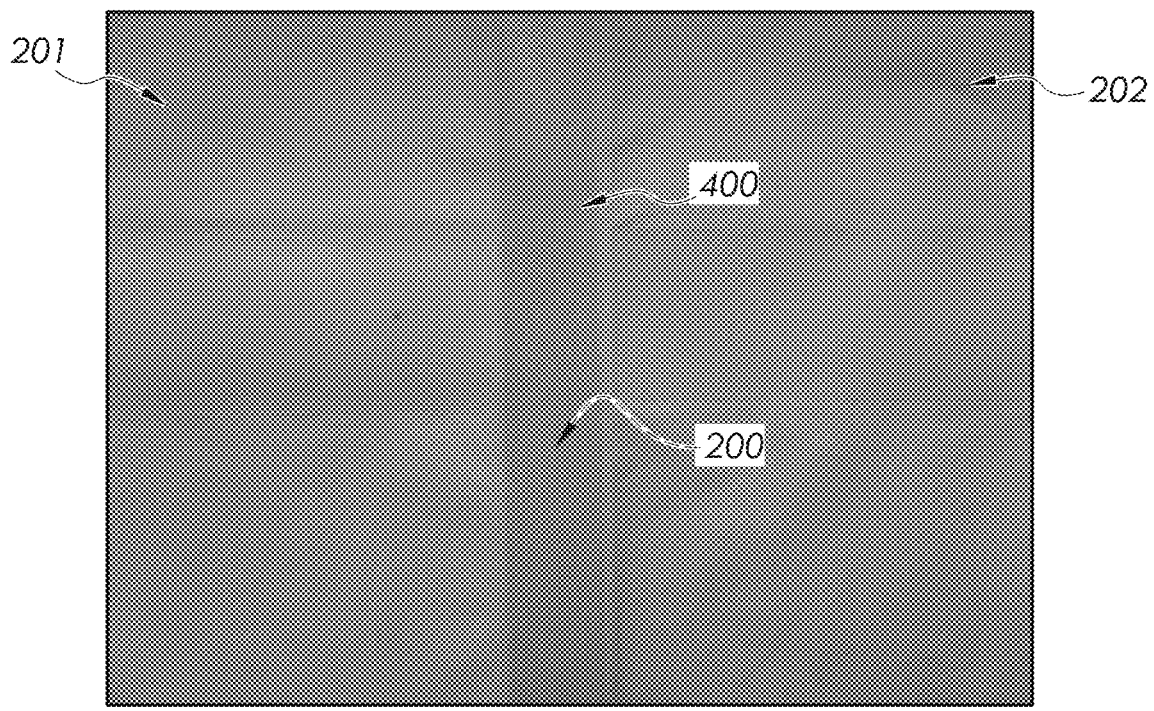
FIG. 4 illustrates an exemplary top front view of a seam for panels of a 70D material according to an embodiment of this invention.
Figure 8:
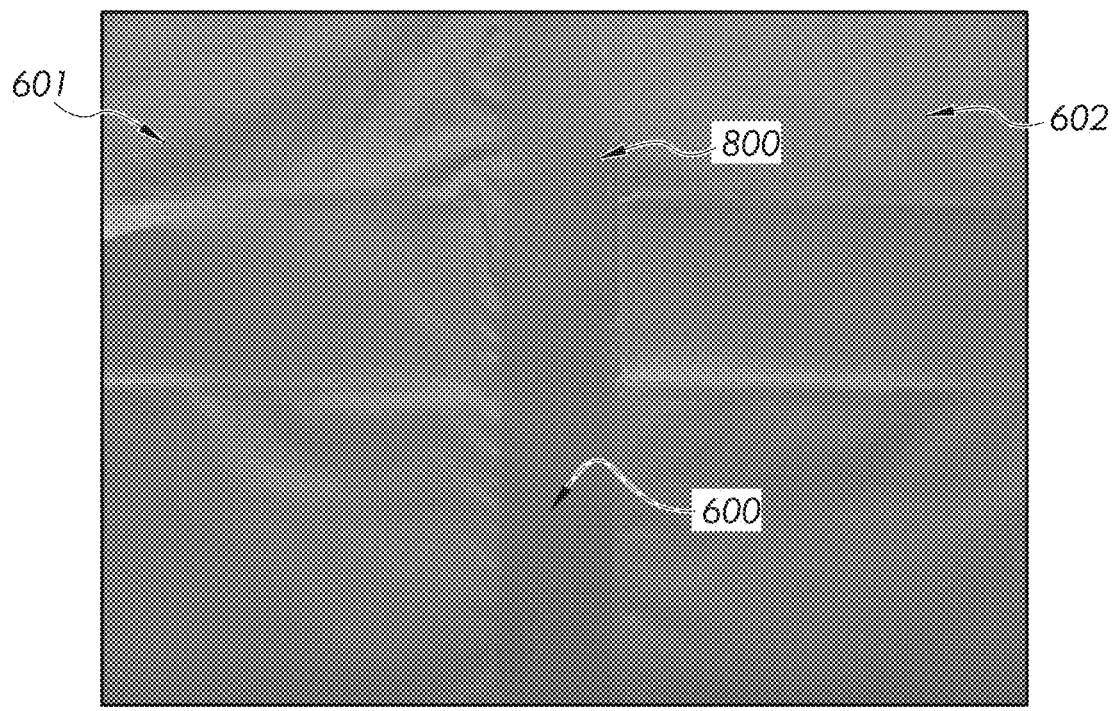
FIG. 8 illustrates an exemplary top front view of a seam for panels of a 20D material according to an embodiment of this invention.

An area adjacent to both sides and along the length of the seam formed in Step 120 may also be coated with polyurethane (PU), thermoplastic polyurethane (TPU), Polyvinyl Chloride (PVC), Ethylene-Vinyl Acetate (EVA), Polytetrafluoroethylene (PTFE), or a combination thereof. Other suitable coating materials may also be used. The coated tape, or more specifically, a section of the tape, may then be overlaid over the coated seam. For example, FIG. 4 illustrates an exemplary tape section 400 overlaying seam 200. FIG. 8 illustrates an exemplary tape section 800 overlaying seam 600.

Figure 5:
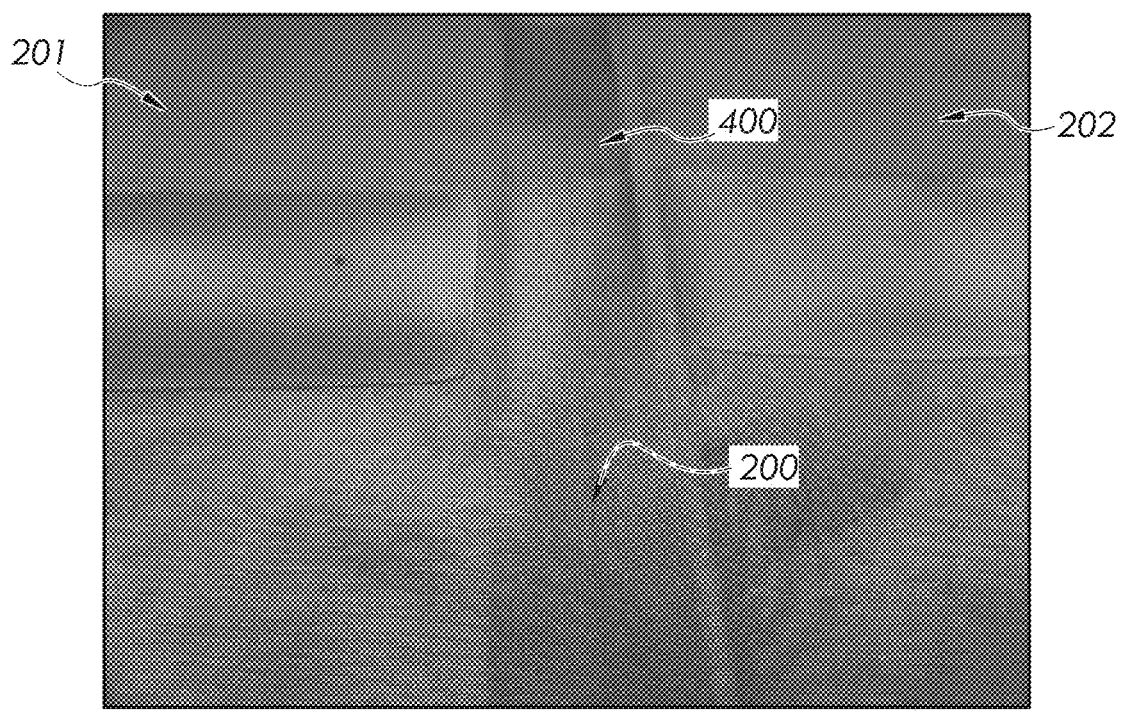
FIG. 5 illustrates an exemplary perspective front view of a seam for panels of a 70D material according to an embodiment of this invention.
Figure 9:
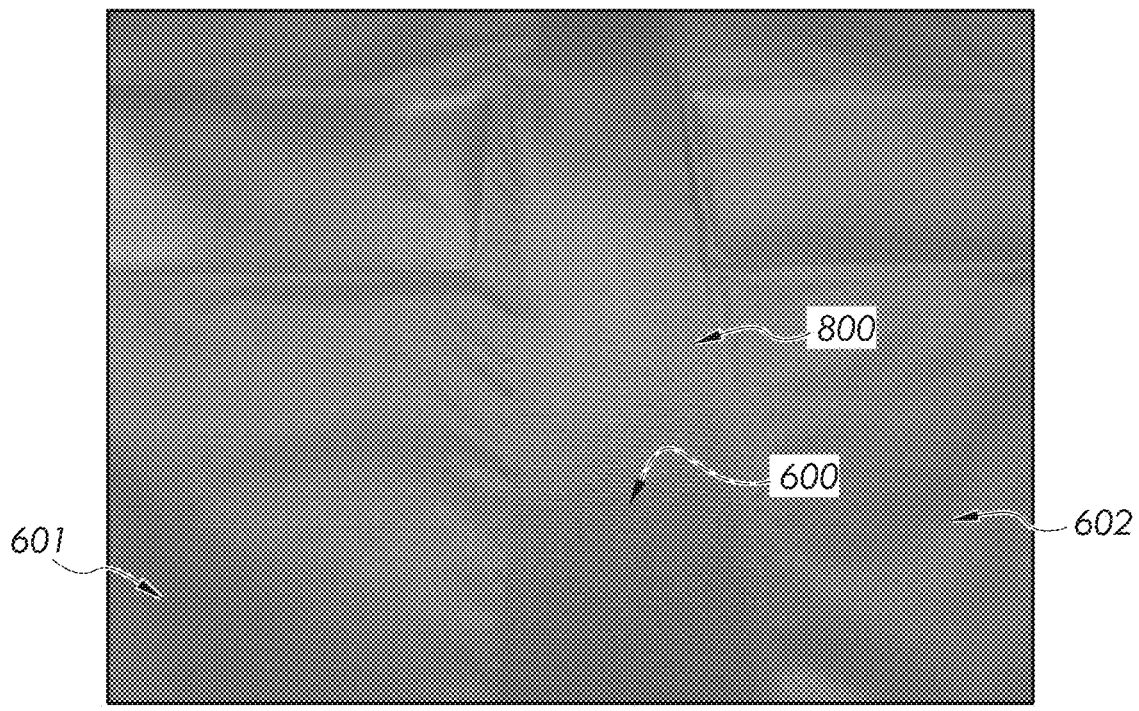
FIG. 9 illustrates an exemplary perspective front view of a seam for panels of a 20D material according to an embodiment of this invention.

In Step 140, in some embodiments, the tape and the seam are then sealed using an RF welding machine. Any conventional RF welding machine known in the art may be used. As a result, a strong, air tight (airproof) and water tight (waterproof) seam is constructed. FIGS. 4 and 5 illustrate an exemplary top front view and an exemplary perspective front view the seal 200 and tape 400 welded (or sealed, or bonded) using a conventional RF welding machine. FIGS. 8 and 9 illustrate an exemplary top front view and an exemplary perspective front view the seal 600 and tape 800 welded (or sealed, or bonded) using a conventional RF welding machine.

Testing has been performed to show the superior strength of seams constructed using the process of the invention, as compared to seams constructed using stitching. FIGS. 10-22 illustrate exemplary test results performed using 20D and 70D materials. The tests include, for example, Breaking Force, Breaking Strength, Elongation at Break, Elongation at Rupture, Breaking Time, Bursting Strength, Break-off Force, Tensile Strength, Tensile Rate, Break-off Strength, Nominal Tensile Strength, and Initial Modulus.

Figure 10:
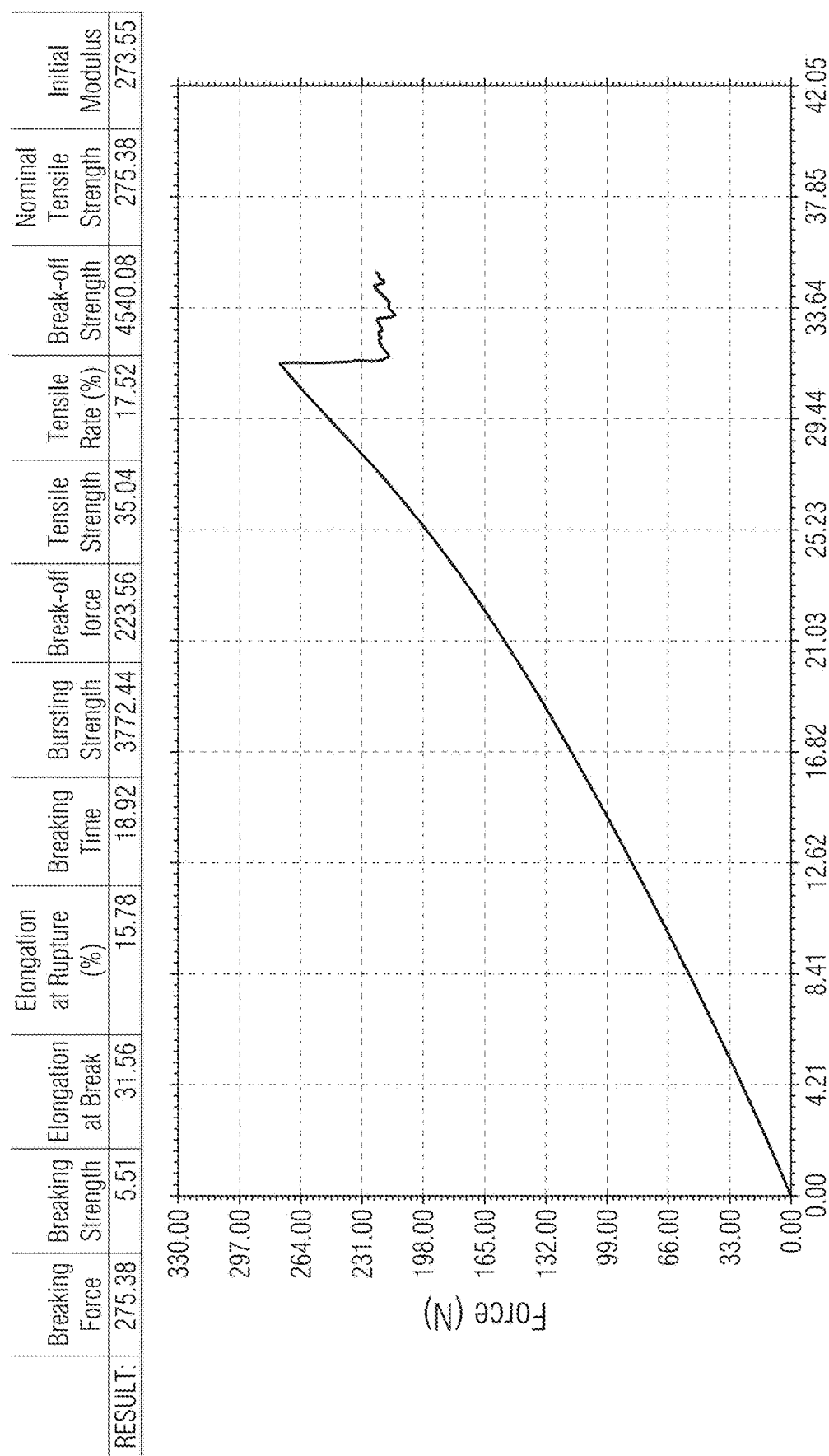
FIG. 10 illustrates exemplary results of an exemplary test using stitching (e.g., 8 stiches per inch) on a 70D material according to an embodiment of this invention.

FIG. 10 illustrates, according to some embodiments, exemplary results of an exemplary test using stitching (e.g., 8 stiches per inch) on a 70D material.

Figure 11:
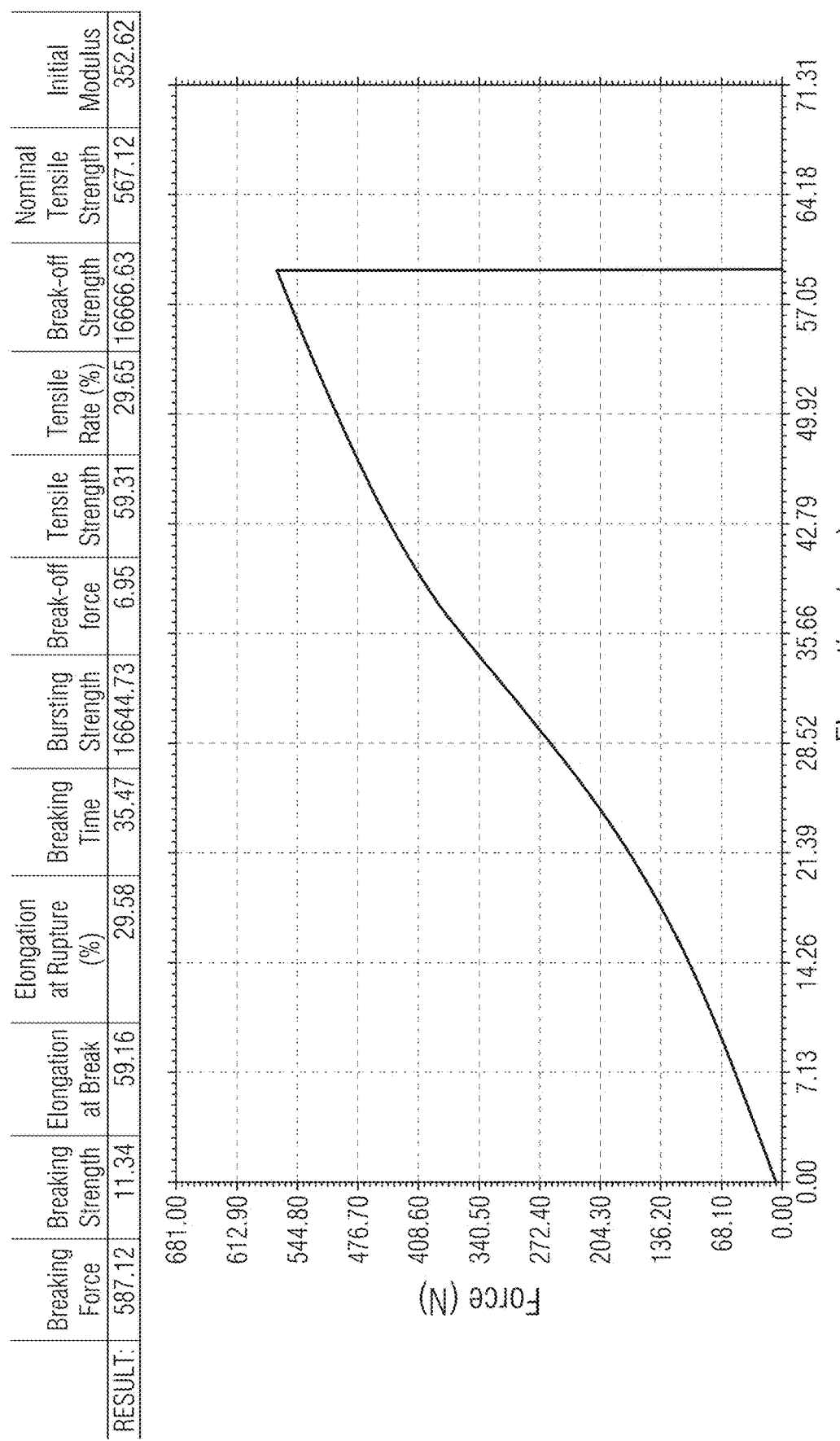
FIG. 11 illustrates exemplary results of an exemplary test using the process of the invention on a 70D material according to an embodiment of this invention.

FIG. 11 illustrates, according to some embodiments, exemplary results of an exemplary test using the process of the invention on a 70D material.

Figure 12:
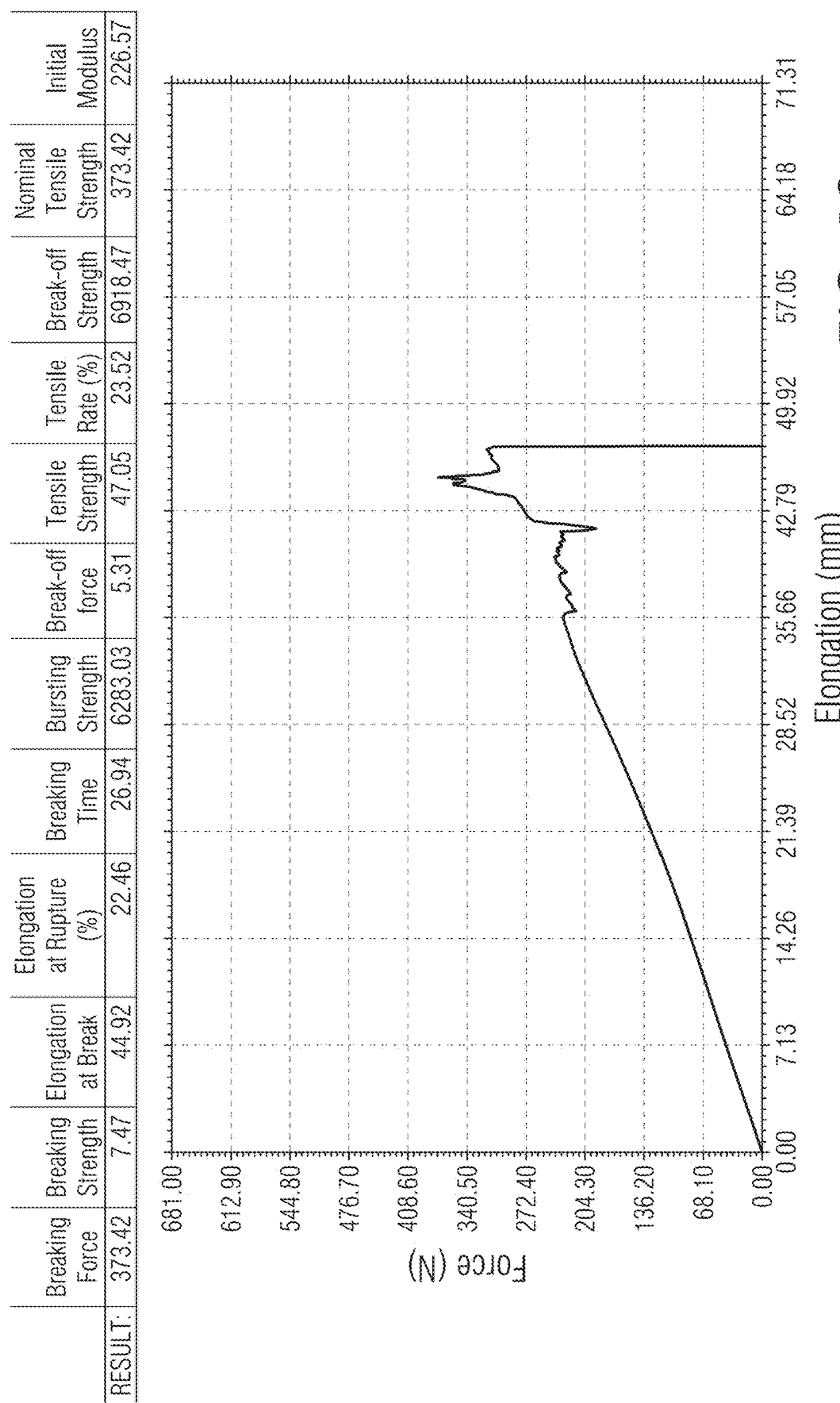
FIG. 12 illustrates exemplary results of another exemplary test using stitching (e.g., 8 stiches per inch) on a 70D material according to an embodiment of this invention.

FIG. 12 illustrates, according to some embodiments, exemplary results of another exemplary test using stitching (e.g., 8 stiches per inch) on a 70D material.

Figure 13:
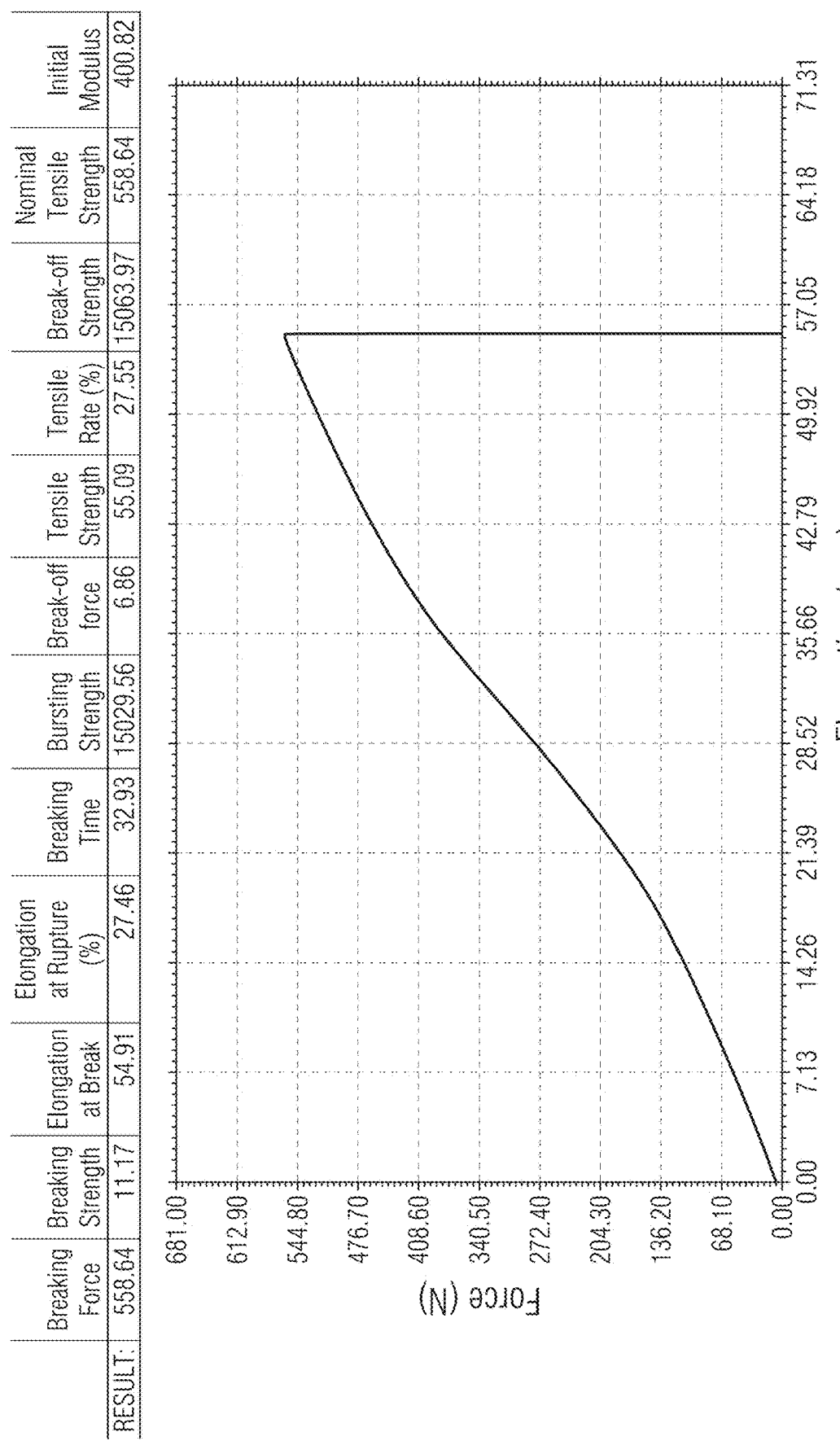
FIG. 13 illustrates exemplary results of another exemplary test using the process of the invention on a 70D material according to an embodiment of this invention.

FIG. 13 illustrates, according to some embodiments, exemplary results of another exemplary test using the process of the invention on a 70D material.

Figure 14:
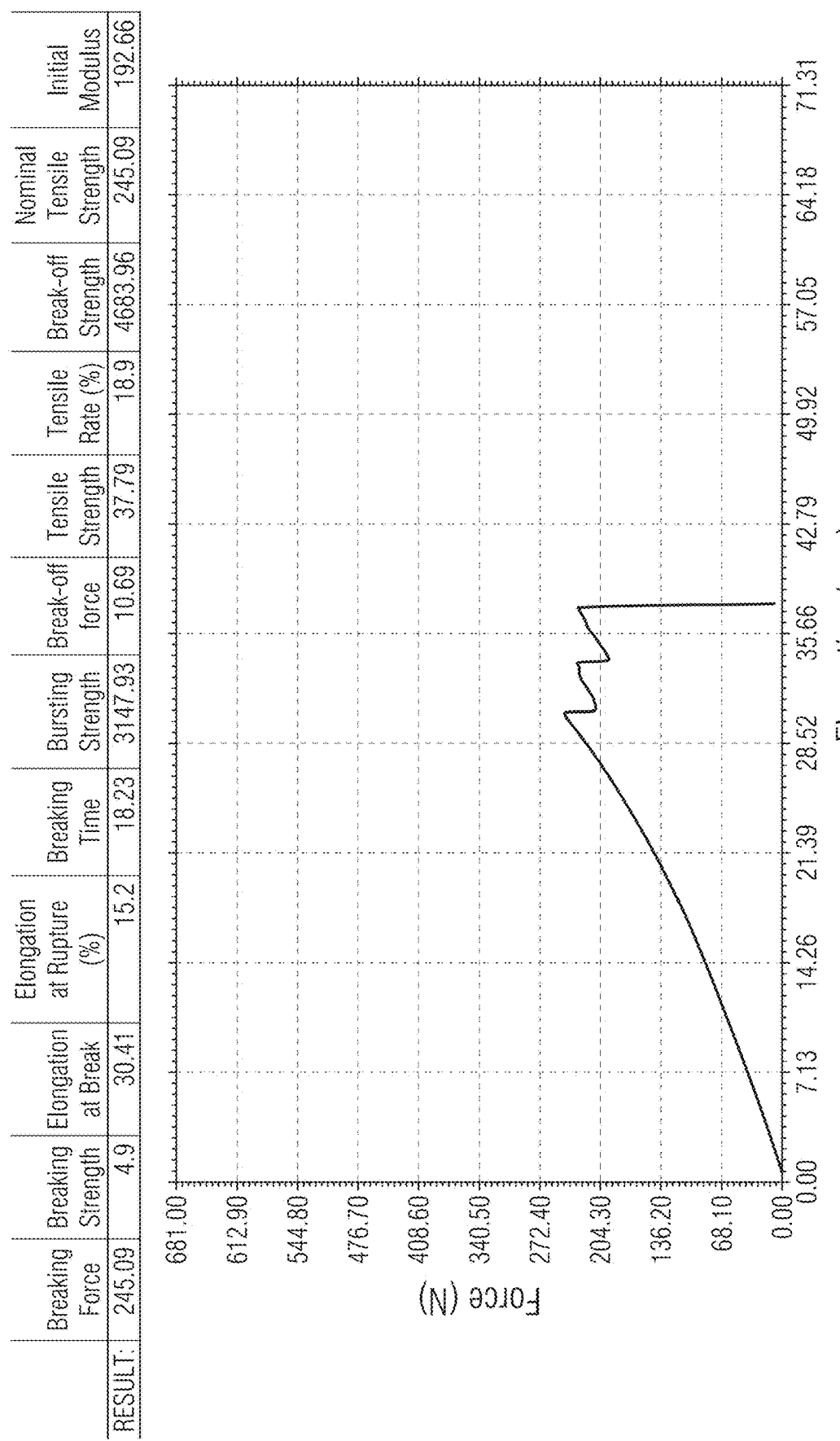
FIG. 14 illustrates exemplary results of another exemplary test using stitching (e.g., 8 stiches per inch) on a 70D material according to an embodiment of this invention.

FIG. 14 illustrates, according to some embodiments, exemplary results of another exemplary test using stitching (e.g., 8 stiches per inch) on a 70D material.

Figure 15:
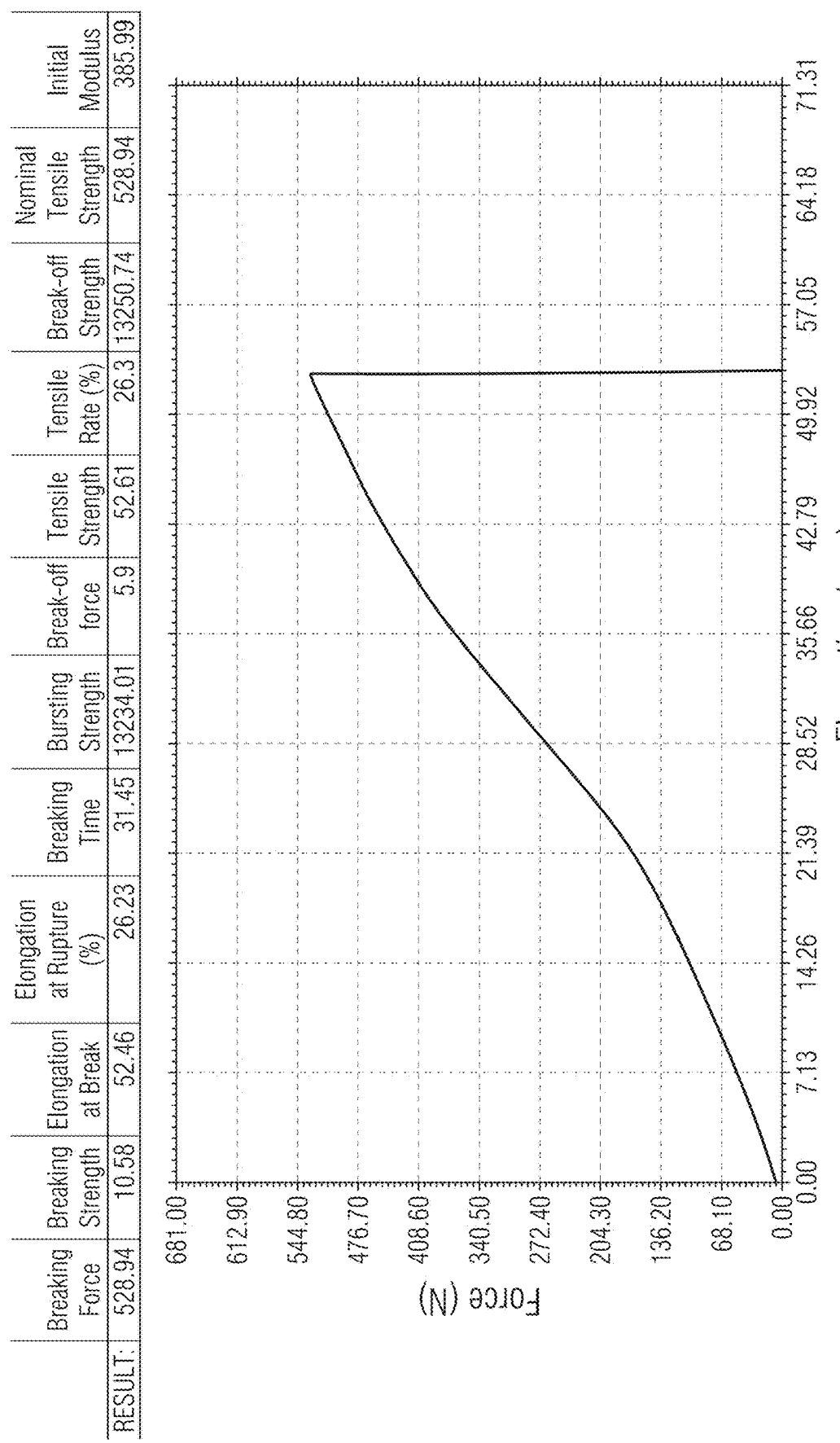
FIG. 15 illustrates exemplary results of another exemplary test using the process of the invention on a 70D material according to an embodiment of this invention.

FIG. 15 illustrates, according to some embodiments, exemplary results of another exemplary test using the process of the invention on a 70D material.

Figure 16:
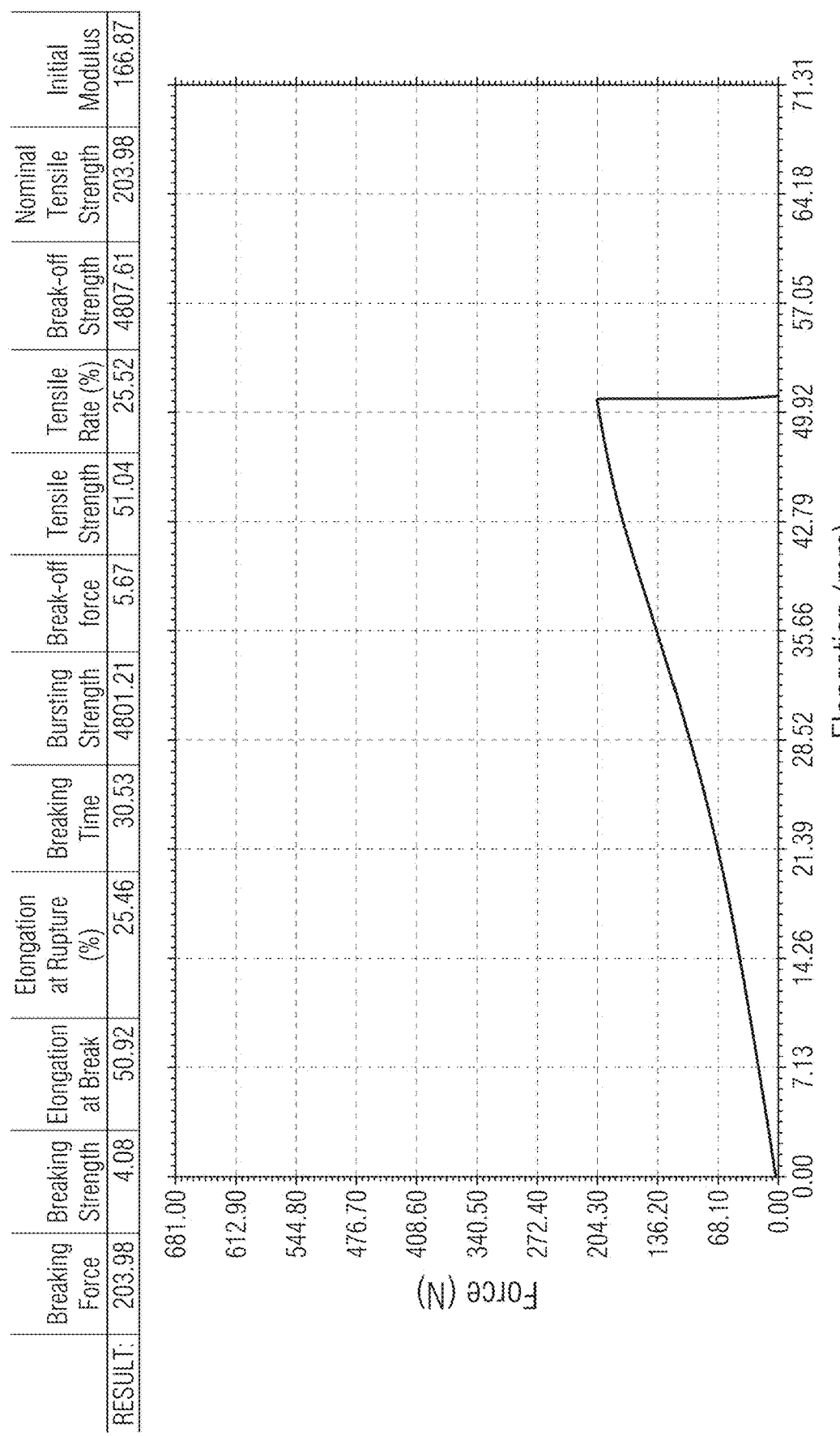
FIG. 16 illustrates exemplary results of an exemplary test using stitching (e.g., 8 stiches per inch) on a 20D material according to an embodiment of this invention.

FIG. 16 illustrates, according to some embodiments, exemplary results of another exemplary test using stitching (e.g., 8 stiches per inch) on a 20D material.

Figure 17:
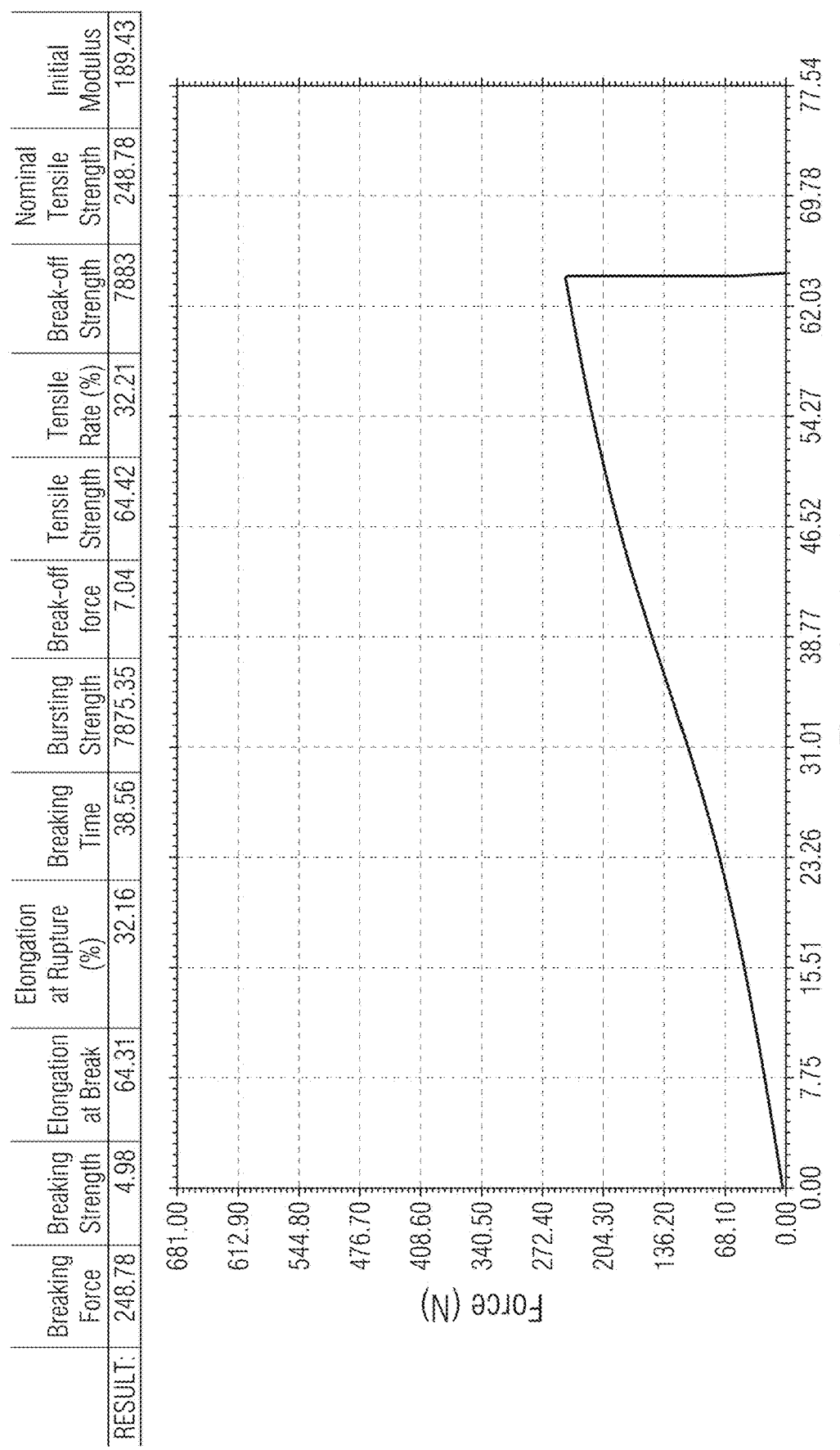
FIG. 17 illustrates exemplary results of an exemplary test using the process of the invention on a 20D material according to an embodiment of this invention.

FIG. 17 illustrates, according to some embodiments, exemplary results of an exemplary test using the process of the invention on a 20D material.

Figure 18:
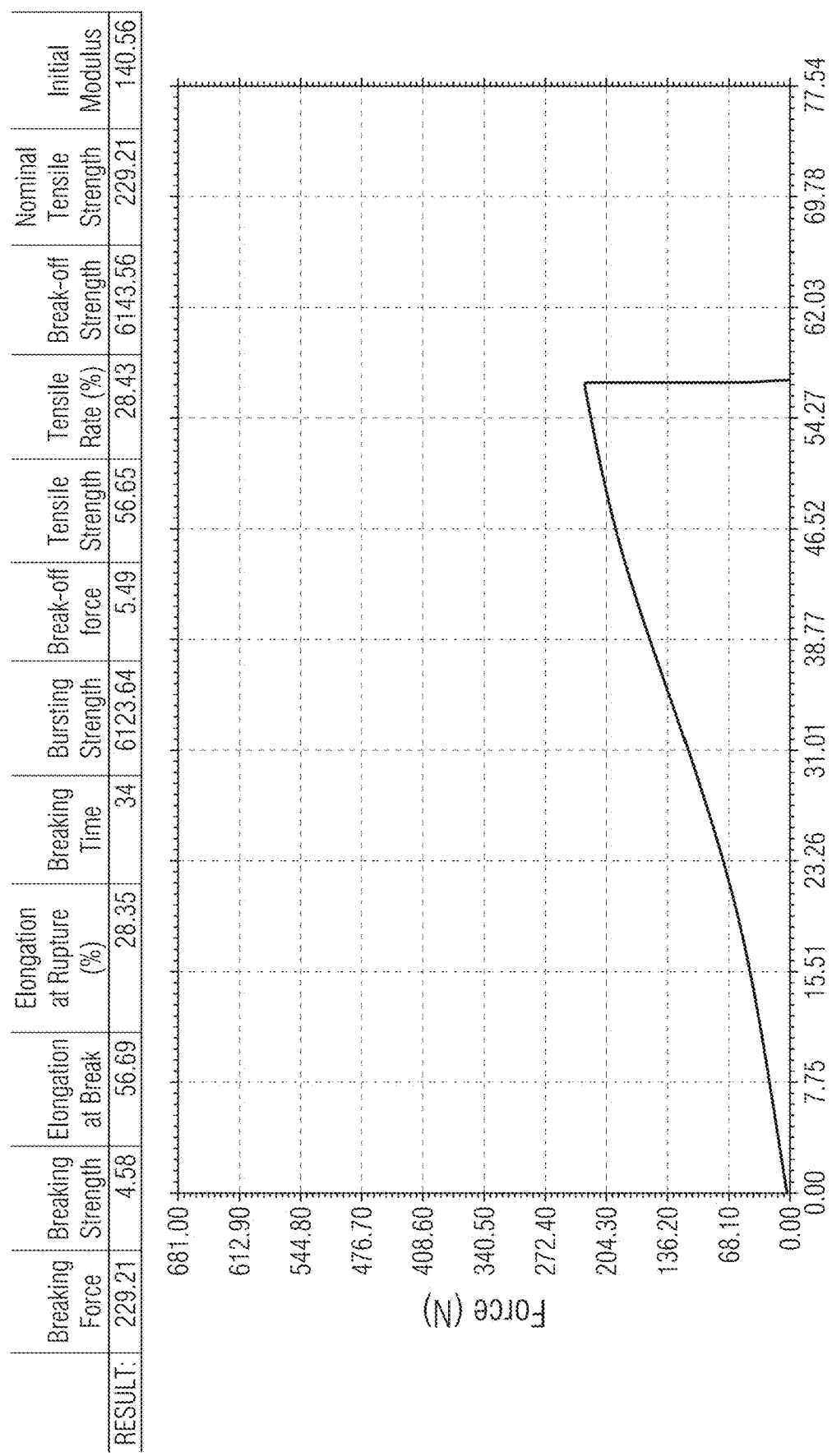
FIG. 18 illustrates exemplary results of another exemplary test using stitching (e.g., 8 stiches per inch) on a 20D material according to an embodiment of this invention.

FIG. 18 illustrates, according to some embodiments, exemplary results of another exemplary test using stitching (e.g., 8 stiches per inch) on a 20D material.

Figure 19:
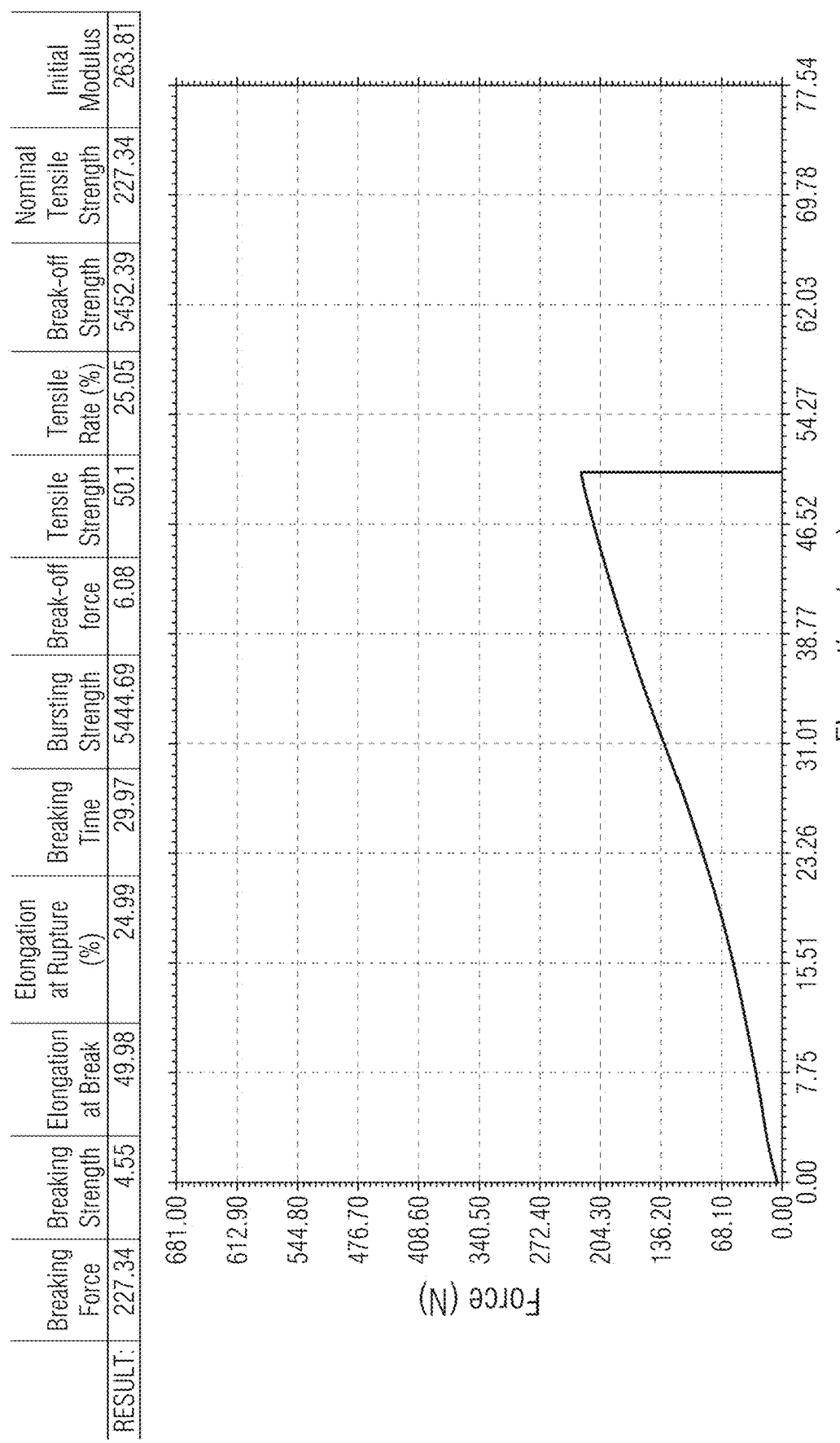
FIG. 19 illustrates exemplary results of another exemplary test using the process of the invention on a 20D material according to an embodiment of this invention.

FIG. 19 illustrates, according to some embodiments, exemplary results of another exemplary test using the process of the invention on a 20D material.

Figure 20:
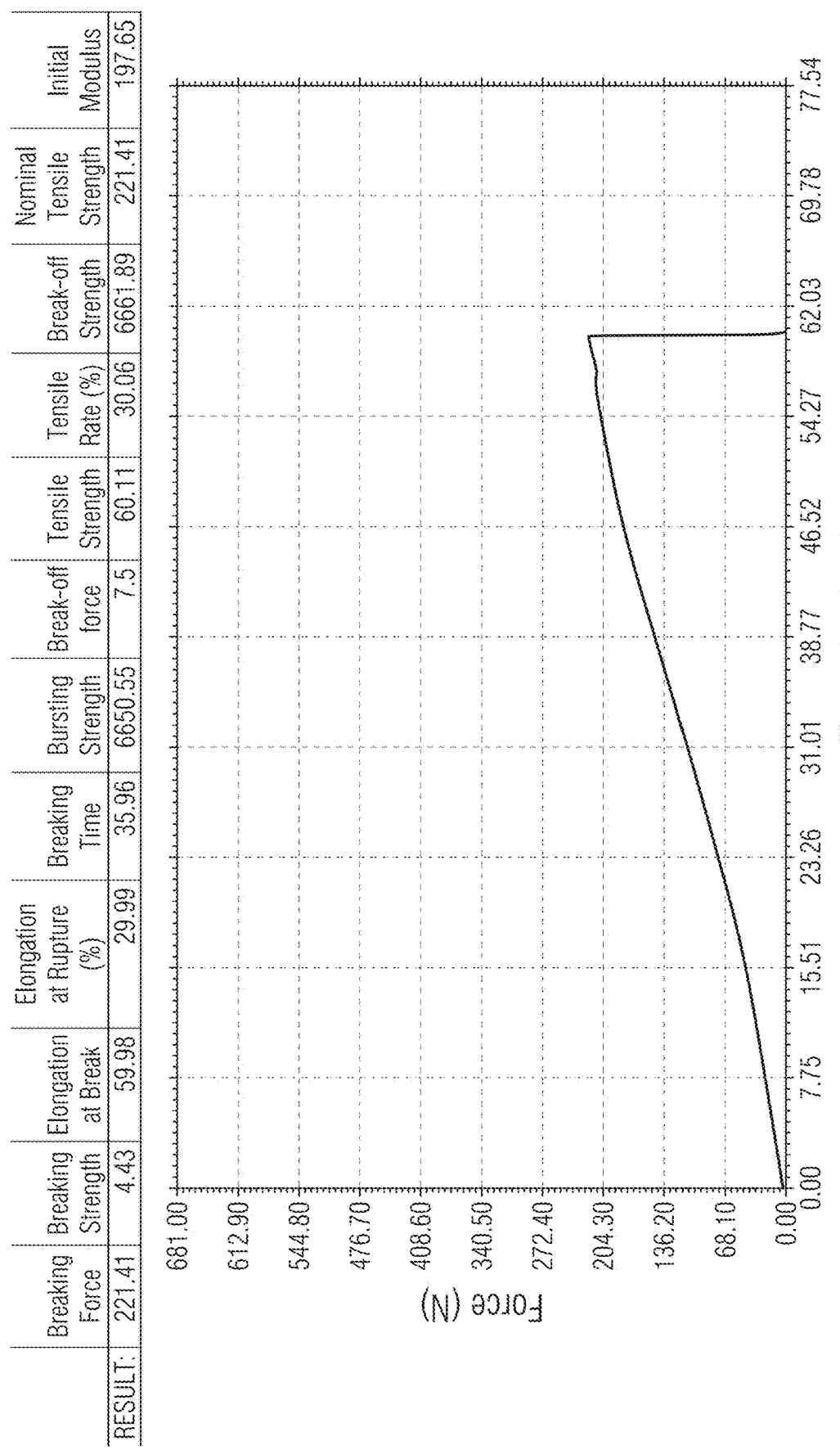
FIG. 20 illustrates exemplary results of another exemplary test using stitching (e.g., 8 stiches per inch) on a 20D material according to an embodiment of this invention.

FIG. 20 illustrates, according to some embodiments, exemplary results of another exemplary test using stitching (e.g., 8 stiches per inch) on a 20D material.

Figure 21:
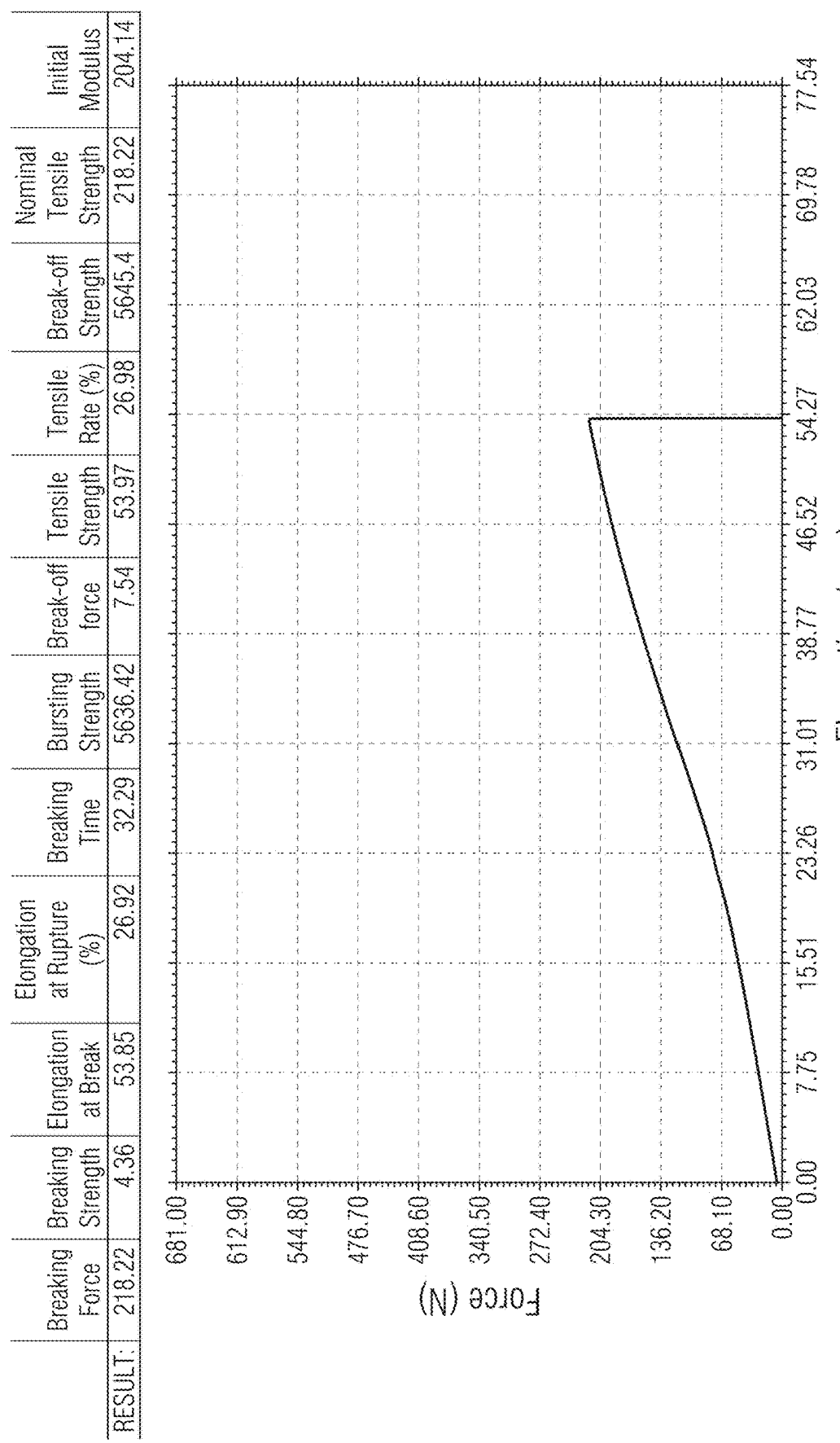
FIG. 21 illustrates exemplary results of another exemplary test using the process of the invention on a 20D material according to an embodiment of this invention.
Figure 23B:
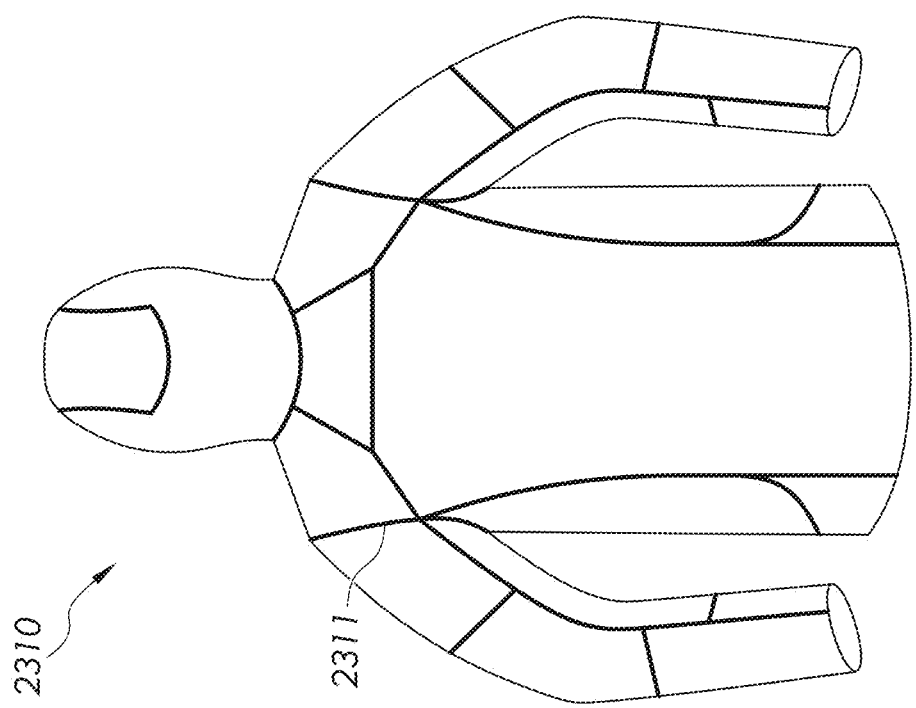
FIG. 23B illustrates an exemplary back view of a jacket according to an embodiment of this invention.
Figure 23A:
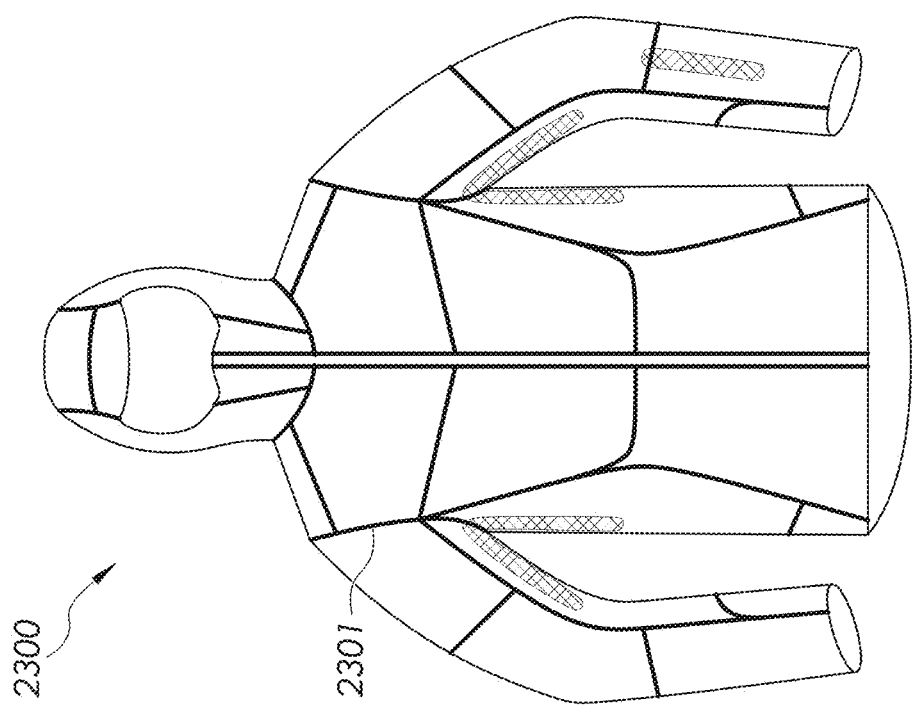
FIG. 23A illustrates an exemplary front view of a jacket according to an embodiment of this invention.

FIG. 21 illustrates, according to some embodiments, exemplary results of another exemplary test using the process of the invention on a 20D material.

FIG. 22 illustrates, according to some embodiments, a chart showing the results of the exemplary tests of FIGS. 10-21.

FIGS. 23-26 illustrate, according to some embodiments, exemplary uses of the invention process on exemplary products. It should be noted that these are only exemplary products shown for illustration purpose only, and the invention process is not limited to these products. FIG. 23A illustrates an exemplary front view 2300 of a jacket. FIG. 23B illustrates an exemplary back view 2310 of a jacket. The exemplary seams 2301 and 2311 shown in dark, bold lines may be formed using the process of the invention. Note that although the numeric labels 2310 and 2311 are shown pointing to respective exemplary seams, other seams shown in dark, bold lines may be formed using the process of the invention.

Figure 24:
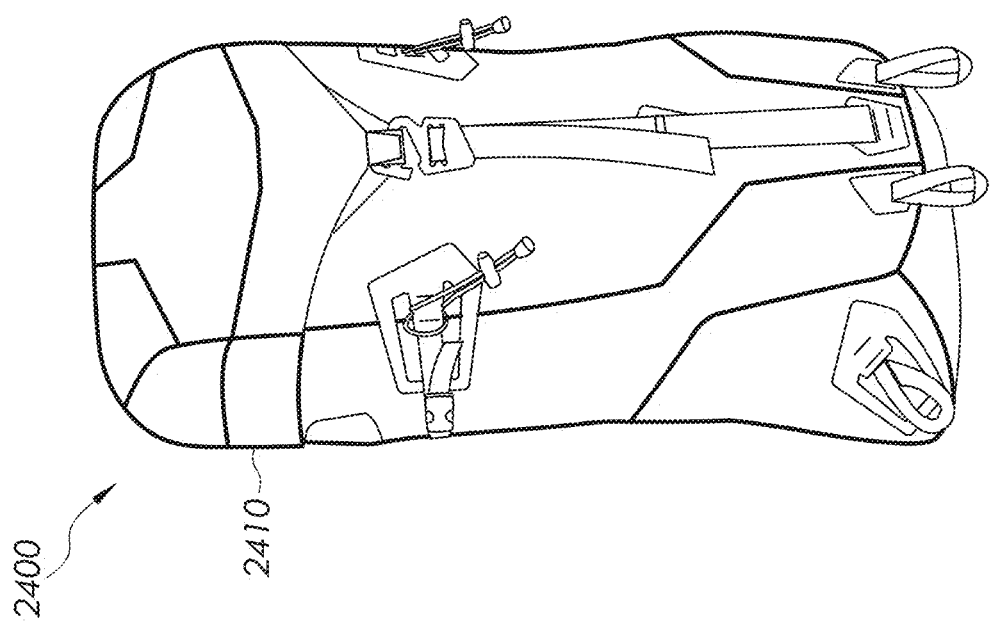
FIG. 24 illustrates an exemplary perspective view of a rucksack according to an embodiment of this invention.

FIG. 24 illustrates, according to some embodiments, an exemplary perspective view 2400 of a rucksack or backpack. The exemplary seams 2410 shown in dark, bold lines may be formed using the process of the invention. Note that although the numeric label 2410 is shown pointing to respective exemplary seam, other seams shown in dark, bold lines may be formed using the process of the invention.

Figure 25:
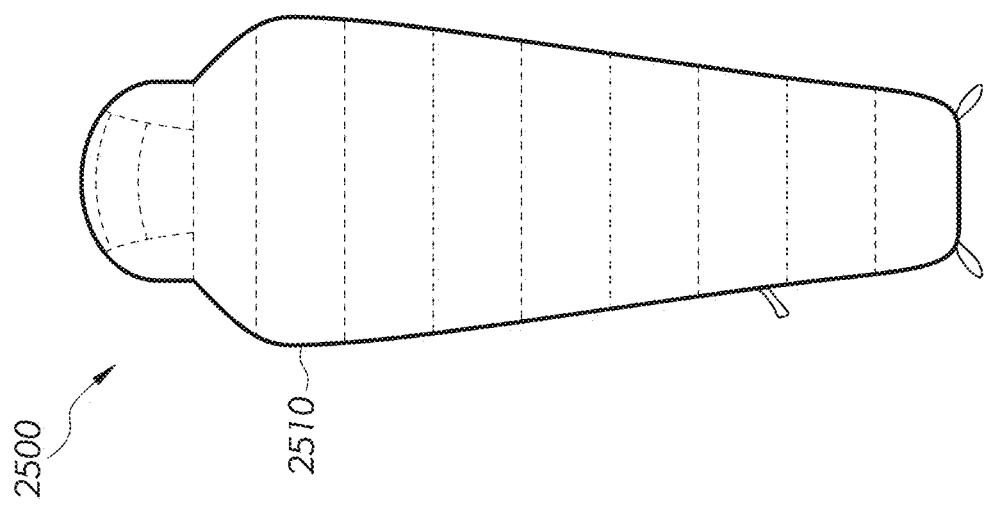
FIG. 25 illustrates an exemplary top view of a sleeping bag according to an embodiment of this invention.

FIG. 25 illustrates, according to some embodiments, an exemplary top view 2500 of a sleeping bag. The exemplary seams 2510 shown in dark, bold lines may be formed using the process of the invention. Note that although the numeric label 2510 is shown pointing to respective exemplary seam, other seams shown in dark, bold lines may be formed using the process of the invention.

Figure 26:
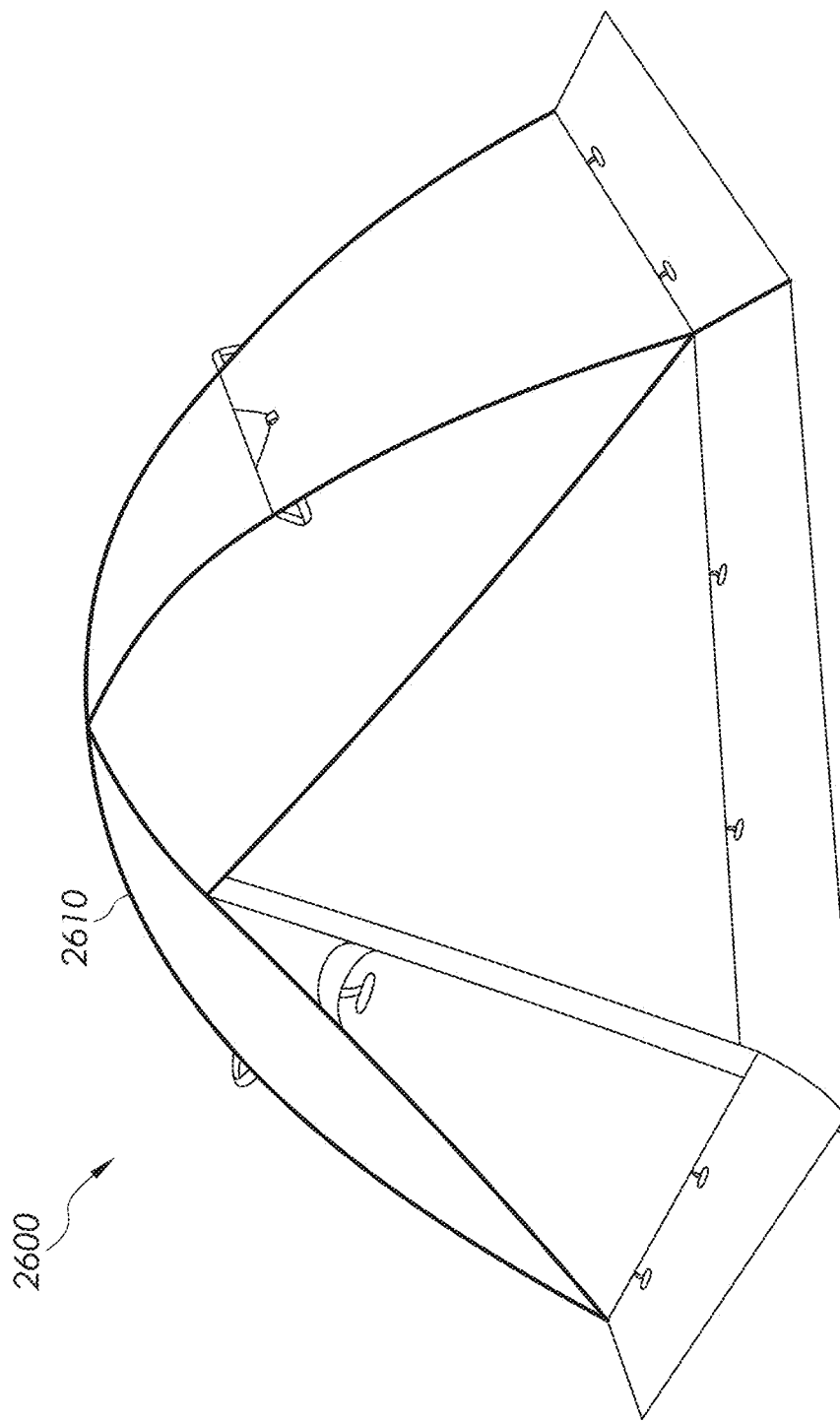
FIG. 26 illustrates an exemplary perspective view of a tent according to an embodiment of this invention.

FIG. 26 illustrates, according to some embodiments, an exemplary perspective view 2600 of a tent. The exemplary seams 2610 shown in dark, bold lines may be formed using the process of the invention. Note that although the numeric label 2610 is shown pointing to respective exemplary seam, other seams shown in dark, bold lines may be formed using the process of the invention.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein, but is to be accorded the widest scope consistent with the principles and novel features disclosed herein.

What is claimed is:

1. A process of constructing an air tight and water tight seam, consisting of the steps occurring in the following sequence:

cutting a sheet of material made of a selected first material into two panels;

sealing the two panels at a respective selected edge of each of the two panels using an ultrasonic machine, forming a seam;

coating an area adjacent to both sides of the seam and along a length of the seam with a second material selected from the group consisting of polyurethane (PU), thermoplastic polyurethane (TPU), Polyvinyl Chloride (PVC), Ethylene-Vinyl Acetate (EVA), or Polytetrafluoroethylene (PTFE);

coating on one side of a section of tape, made of the selected first material, with a third material selected from the group consisting of PU, TPU, PVC, EVA, or PTFE;

overlaying the seam with the section of tape; and sealing the overlaid section of tape and the seam using a radio frequency (RF) welding machine.

2. The process of claim 1, wherein the overlaying step comprises overlaying the coated surface side of the section of tape against the coated surface side of the seam.

3. The process of claim 1, wherein the panels are cut based on one or more specifications of a desired product.

4. A manufacturing system for constructing an air tight and water tight seam, the manufacturing system constructing the air tight and water tight seam consisting of the steps occurring in the following sequence:

cutting a sheet of material made of a selected first material into two panels;

sealing the two panels at a respective selected edge of each of the two panels using an ultrasonic machine, forming a seam;

coating an area adjacent to both sides of the seam and along a length of the seam with a second material selected from the group consisting of polyurethane (PU), thermoplastic polyurethane (TPU), Polyvinyl Chloride (PVC), Ethylene-Vinyl Acetate (EVA), or Polytetrafluoroethylene (PTFE);

coating on one side of a section of tape, made of the selected first material, with a third material selected from the group consisting of PU, TPU, PVC, EVA, or PTFE;

overlaying the seam with the section of tape; and sealing the overlaid section of tape and the seam using a radio frequency (RF) welding machine.

5. The manufacturing system of claim 4, wherein the overlaying step comprises overlaying the coated surface side of the section of tape against coated surface side of the seam.

6. The manufacturing system of claim 4, wherein the panels are cut based on one or more specifications of a desired product.

* * * * *